US010107313B2

(12) United States Patent
Kwon et al.

(10) Patent No.: US 10,107,313 B2
(45) Date of Patent: Oct. 23, 2018

(54) ROTARY ACTUATOR

(71) Applicant: SUNGJI HYDRAULICS CO., LTD., Changwon-si, Gyeongsangnam-do (KR)

(72) Inventors: Gwang Ryel Kwon, Changwon-si (KR); Gye Yong Song, Gimhae-si (KR)

(73) Assignee: SUNGJI HYDRAULICS CO., LTD., Changwon-si, Gyeongsangnam-do (KR)

( * ) Notice: Subject to any disclaimer, the term of this patent is extended or adjusted under 35 U.S.C. 154(b) by 0 days.

(21) Appl. No.: 15/540,508

(22) PCT Filed: Mar. 3, 2016

(86) PCT No.: PCT/KR2016/002137
§ 371 (c)(1),
(2) Date: Jun. 28, 2017

(87) PCT Pub. No.: WO2016/140532
PCT Pub. Date: Sep. 9, 2016

(65) Prior Publication Data
US 2017/0350423 A1 Dec. 7, 2017

(30) Foreign Application Priority Data
Mar. 4, 2015 (KR) .................. 10-2015-0030164

(51) Int. Cl.
*F15B 15/06* (2006.01)
*F15B 15/28* (2006.01)
*F15B 15/14* (2006.01)
*F16C 33/74* (2006.01)
*F16C 17/04* (2006.01)
*F16C 33/66* (2006.01)
(Continued)

(52) U.S. Cl.
CPC ........ *F15B 15/063* (2013.01); *F15B 15/1433* (2013.01); *F15B 15/1447* (2013.01);
(Continued)

(58) Field of Classification Search
CPC .............. F15B 15/063; F15B 15/1433; F15B 15/1447; F15B 15/2807; F15B 15/149;
(Continued)

(56) References Cited

U.S. PATENT DOCUMENTS 3,154,954 A * 11/1964 Geyer ................. F16H 25/04
160/188
3,187,592 A * 6/1965 Geyer ................. F01B 9/04
74/89
(Continued)

FOREIGN PATENT DOCUMENTS

EP 0491078 A1 * 6/1992 ............. F01B 3/005
GB 997281 A * 7/1965 ............. B64C 25/02
(Continued)

OTHER PUBLICATIONS

International Search Report dated Jun. 21, 2016 corresponding to International Application No. PCT/KR2016/002137.

*Primary Examiner* — Marcus Charles
(74) *Attorney, Agent, or Firm* — Hauptman Ham, LLP

(57) ABSTRACT

A rotary actuator where a thrust bearing ring is positioned at an inside of a tube assembly accommodating oil, thereby reducing abrasion and damage caused by rolling friction and improving rotary power of an axle load by increasing hydraulic pressure of a piston. The rotary actuator includes the tube assembly, a piston, an axle load assembly, and a thrust bearing ring. The tube assembly is provided with a tube spiral portion where a spiral is formed at an inner circumference surface, and is formed of a first passage where oil flows into and out and a second passage spaced apart from the first passage by a fixed distance.

5 Claims, 4 Drawing Sheets

(51) Int. Cl.
*F16C 27/06* (2006.01)
*F16H 25/20* (2006.01)

(52) U.S. Cl.
CPC ........ *F15B 15/2807* (2013.01); *F16C 27/063* (2013.01); *F16C 33/6607* (2013.01); *F16C 33/74* (2013.01); *F15B 15/149* (2013.01); *F16H 25/2006* (2013.01)

(58) Field of Classification Search
CPC .... F16H 25/2006; F16C 33/74; F16C 27/063; F16C 17/04; F16C 33/6607
USPC ....... 384/152, 154, 248, 261, 291, 420, 130, 384/151, 322; 92/33, 113, 178; 74/63, 74/89.34
See application file for complete search history.

(56) References Cited

U.S. PATENT DOCUMENTS

| | | | | |
|---|---|---|---|---|
| 4,794,845 A | * | 1/1989 | Vick | F15B 9/09 137/625.23 |
| 4,881,419 A | * | 11/1989 | Weyer | B60G 21/0553 74/424.92 |
| 5,038,672 A | * | 8/1991 | Beuschau | B60G 21/0555 74/99 A |
| 5,671,652 A | * | 9/1997 | Weyer | F15B 15/06 92/107 |
| 6,247,390 B1 | * | 6/2001 | Busch | B60G 21/0555 92/136 |
| 2001/0020413 A1 | * | 9/2001 | Hirano | F01C 9/002 91/394 |
| 2010/0064885 A1 | * | 3/2010 | Werkhoven | F15B 1/12 92/121 |
| 2011/0154920 A1 | * | 6/2011 | Weyer | E02F 3/3677 74/25 |

FOREIGN PATENT DOCUMENTS

| | | | | |
|---|---|---|---|---|
| JP | 06-307410 A | | 11/1994 | |
| JP | 2003-194015 A | | 7/2003 | |
| KR | 20040064917 A | * | 7/2004 | ............. A01D 46/20 |
| KR | 10-0487981 B1 | | 9/2005 | |
| KR | 10-0929525 B1 | | 12/2009 | |
| KR | 20100063484 A | * | 6/2010 | |
| KR | 10-1396127 B1 | | 5/2014 | |

* cited by examiner

ROTARY ACTUATOR

CROSS-REFERENCE TO RELATED APPLICATIONS

This application is a National Phase Application of PCT International Application No. PCT/KR2016/002137, which was filed on Mar. 3, 2016, and which claims priority from Korean Patent Application No. 10-2015-0030164 filed with the Korean Intellectual Property Office on Mar. 4, 2015. The disclosures of the above patent applications are incorporated herein by reference in their entirety.

BACKGROUND OF THE INVENTION

Field of the Invention

The present invention relates to a rotary actuator. More particularly, the present invention relates to a rotary actuator, including: a tube assembly means accommodating oil; an additional support block which is positioned at opposite end portions at an inside of the tube assembly means and of which an area is greater than a tube end surface, and which thus supports a bearing ring provided with large area; and a thrust bearing ring which is positioned under the oil and thus has small frictional force, and which is supported by the support block. And thus consequently, the rotary actuator is capable of supporting a far higher axial direction load by virtue of a large area and also capable of being rotated with the small frictional force, thereby reducing abrasion and damage caused by rolling friction, and further capable of improving rotary power of an axle load by increasing a hydraulic pressure area of a piston.

Background Art

Korean Patent application Publication No. 10-0487981 has disclosed a fluid-powered rotary actuator in which axial motion of a piston is rotatably moved between a body and an output shaft.

FIG. 4 is a drawing illustrating a rotary actuator disclosed in the Korean Patent application Publication No. 10-0487981. In the case of FIG. 4, a shaft 120 is mounted at an inside of a body 110, and a shaft screw 130 is screwly engaged with the other end. A piston sleeve 140 is mounted between the body 110 and the shaft 120, and a thrust bearing ring 150 is positioned between one end portion of the body 110 and one end portion 124 of the shaft 120, and the other end portion of the body 110 and one end portion 132 of the shaft screw 130.

When the piston sleeve 140 performs rectilinear reciprocating motion in an axial direction at the inside of the body 110, an outer helical spline 144 of the piston sleeve 140 is engaged with an inner helical spline 116 of the body 110 in order to rotate the piston sleeve 140, and rectilinear motion and rotary motion of the piston sleeve 140 is transmitted to an outer helical spline 122 of the shaft 120 which is engaged with an inner helical spline 142 of the piston sleeve 140 in order to rotate the shaft 120. When a fluid flows into a first port 112 or a second port 114, the piston sleeve 140 performs the rectilinear motion and rotary motion by virtue of hydraulic pressure and simultaneously performs reciprocating motion in the axial direction such that the shaft 120 performs the rotary motion.

(b) Description of the Related Art

DETAILED EXPLANATION OF THE INVENTION

Technological Challenge

In a conventional rotary actuator depicted in FIG. 4, a piston portion 146 of a piston sleeve 140 is positioned toward a shaft 120 and a sleeve portion 148 is positioned toward a shaft screw 130. In order to increase rotary power of the shaft 120, fluid pressure pressurizing the piston portion 146 may be heightened or hydraulic pressure of the piston sleeve 140 may be increased. The piston portion 146 may be designed great in order to increase the hydraulic pressure of the piston sleeve 140. To do so, a diameter of the shaft 120 contacting the piston portion 146 may be designed small. Furthermore, in order to increase the rotary power of the shaft 120, a diameter of the shaft 120 formed of an outer helical spline 122 to which rotary power of the piston sleeve 140 is transmitted may be designed great. Accordingly, to satisfy aforementioned conditions, the diameter of the shaft 120 around a section contacting the piston portion 146 may be designed small, whereas the diameter of the shaft 120 around a section formed of the outer helical spline 122 may be designed great.

Furthermore, thickness of the piston portion 146 in the piston sleeve 140 may be great, whereas thickness of a sleeve portion 149 therein may be small. Meanwhile, In the case of the conventional rotary actuator, after the piston sleeve 140 is inserted, a shaft screw 130 is screwly engaged with the other end portion of the shaft 120. In this case, the piston portion 146 is positioned toward the shaft 120 and the sleeve portion 148 is positioned toward the shaft screw 130 such that the piston portion 146 is first inserted. Therefore, when the shaft 120 and the piston sleeve 140 satisfy the aforementioned conditions, assembly is not possible. So, as depicted in FIG. 4, in the case of the shaft 120 of the conventional actuator, both the diameter of the section contacting the piston portion 146 and the diameter of the section formed of the outer helical spline 122 are equally formed. And thus consequently, in this case, shortcomings that a diameter of the piston portion 146 may not be designed great such that the hydraulic pressure of the piston sleeve 140 may not be increased, and further a diameter of the outer helical spline may not be large have existed.

Additionally, In the case of the conventional rotary actuator, a body 110 is fixed and the shaft 120 is rotated by rectilinear motion and rotary motion of the piston sleeve 140. In this case, rolling friction occurs between the body 110 and the shaft 120. A thrust bearing ring 150 is installed between one end portion of the body 110 and one end portion 124 of the shaft 120, and the other end portion of the body 110 and one end portion 132 of the shaft screw 130 in order to reduce the rolling friction occurring between the body 110 and the shaft 120. However, when the rotary actuator is continuously used, a hydraulic pressure area of the thrust bearing ring 150 functioning as a slider becomes small (structurally, a hydraulic pressure area greater than a cross-sectional area of a tube may not be formed) and a lubricant is not continuously supplied, thereby resulting in a problem that abrasion occurs quickly due to rolling friction of a high axial load.

An exemplary embodiment of the present invention has been made in an effort to solve the aforementioned problems. The present invention provides a rotary actuator where rotary power of an axle load may be improved by increasing a hydraulic pressure area of a piston; and an additional support block of which an area is greater than a tube end surface which is supported by a thrust bearing ring provided with a large area is installed at an inside of a tube always filled with oil, such that the rotary actuator withstands a high axial load by virtue of a large area and lubricating action is always performed by virtue of the oil at the inside of the tube, thereby reducing abrasion of the thrust bearing ring during rolling friction of the high axial load and thus increasing durability even when the high axial load is applied.

SUMMARY OF THE INVENTION

A rotary actuator according to an exemplary embodiment of the present invention includes a tube assembly means, a piston, an axle load assembly means, and a thrust bearing ring. The tube assembly means includes a tube formed of a first passage where an inside is penetrated and oil flows into and out of the inside and a second passage spaced apart from the first passage by a fixed distance; and a support block where one end is supported by one side of the tube at an inside of the tube. The piston is engaged with the tube assembly means and is mounted at an inside of the tube assembly means in order to move while rotating in a direction of the second passage when the oil flows into the first passage. The axle load assembly means is configured for one end portion to close one end portion of the tube assembly means; configured for the other portion to close the other portion of the tube assembly means; and is configured to be engaged with the piston and to be inserted thereinto in order to rotate when the piston is moved. The thrust bearing ring is configured for one end surface to contact a side surface of the axle load assembly means; configured for the other end surface to contact the other end surface of the support block in order to reduce frictional force of the axle load assembly means and the tube assembly means; and is configured to be positioned at one end portion of the tube assembly means and the other end portion thereof at the inside of the tube assembly means in order to be exposed to the oil.

According to the rotary actuator, the tube is preferably provided with a tube spiral portion formed around an inner circumference surface. In this case, the piston is provided with an inner spiral portion formed around an inner circumference surface and an outer spiral portion formed around an outer circumference surface in order to be engaged with the tube spiral portion. Additionally, the axle load assembly means is provided with an axle load spiral portion engaged with an inner spiral portion of the piston in order to be rotatable when the piston is moved.

Furthermore, according to the rotary actuator, the axle load assembly means is preferably provided with an axle load and an end cap. The axle load is configured for one end portion to be supported by the thrust bearing ring positioned at one end portion of the tube assembly means; configured to be exposed to one end of the tube assembly means and to close one end portion of the tube assembly means; and is configured to be inserted into the piston by including the axle load spiral portion. The end cap is configured to be supported by the thrust bearing ring positioned at the other end portion of the tube assembly means; configured to be exposed to the other end of the tube assembly means and to close the other end of the tube assembly means; and is configured to be fixedly engaged with the other end of the axle load.

Furthermore, according to the rotary actuator, the piston is preferably provided with a head portion and a body portion. The head portion is configured for an upper portion to contact the inside of the tube assembly means; and is configured for a lower portion to contact an outside of the axle load in order to slide by being pressurized by the oil. The body portion is configured to be extended to one end portion of the axle load from one side of the head portion; configured to be provided with the outer spiral portion at the upper portion thereof and the inner spiral portion at the lower portion thereof; and is configured to rotate the axle load when the head portion slides by being pressurized by the oil.

Furthermore, according to the rotary actuator, it is preferable that the body portion is formed of a through hole in order for the oil to flow from an upper portion of the body portion into a lower portion thereof.

Furthermore, according to the rotary actuator, it is preferable that a diameter of the axle load contacting a lower portion of a piston head portion is smaller than that of the axle load formed of the axle load spiral portion.

Furthermore, according to the rotary actuator, the tube assembly means is preferably formed of a tube and a support block. The tube is provided with the tube spiral portion, and is formed of the first passage and the second passage. One end of the support block is supported by one side of the tube at the inside of the tube and the other end thereof supports the thrust bearing ring.

Furthermore, it is preferable that the rotary actuator may further include a ring positioned between opposite ends of the tube assembly means and opposite end portions of the axle load assembly means which close opposite end portions of the tube assembly means in order to prevent a foreign substance from flowing inside the tube assembly means.

Furthermore, according to the rotary actuator, it is preferable that the opposite ends of the tube assembly means are formed of a wedge-shaped groove in order for the ring to be inserted; and the axle load assembly means is obliquely formed in order for a pressure surface of the ring inserted into the groove to perform pressurization in an oblique direction toward an center axis of the tube assembly means.

Effect of the Invention

According to the present invention, a tube assembly means is provided with an additional support block of which an area is greater than a tube end surface such that a contact area of a thrust bearing may be enlarged. Accordingly, the tube assembly means may withstand a far higher axial load applied to the thrust bearing ring. Furthermore, the thrust bearing ring is positioned at an inside of the tube assembly means accommodating oil such that the thrust bearing ring is always exposed to the oil and performs lubricating action, thereby reducing abrasion and damage caused by rolling friction during the rolling friction of the high axial load.

Furthermore, according to the present invention, rotary power of the axle load may be improved by increasing a hydraulic pressure area of a piston as much as a diameter difference between an axle load spiral portion, the piston, and a sliding portion and by enlarging a diameter of the axle load spiral portion engaged with a body portion of the piston.

Consequently, it is advantageously possible to realize a rotary actuator capable of providing a far greater output by virtue of the thrust bearing ring which is exposed to the oil functioning as a lubricant and is provided with a large area, and piston action increasing the hydraulic pressure.

Figure 1:
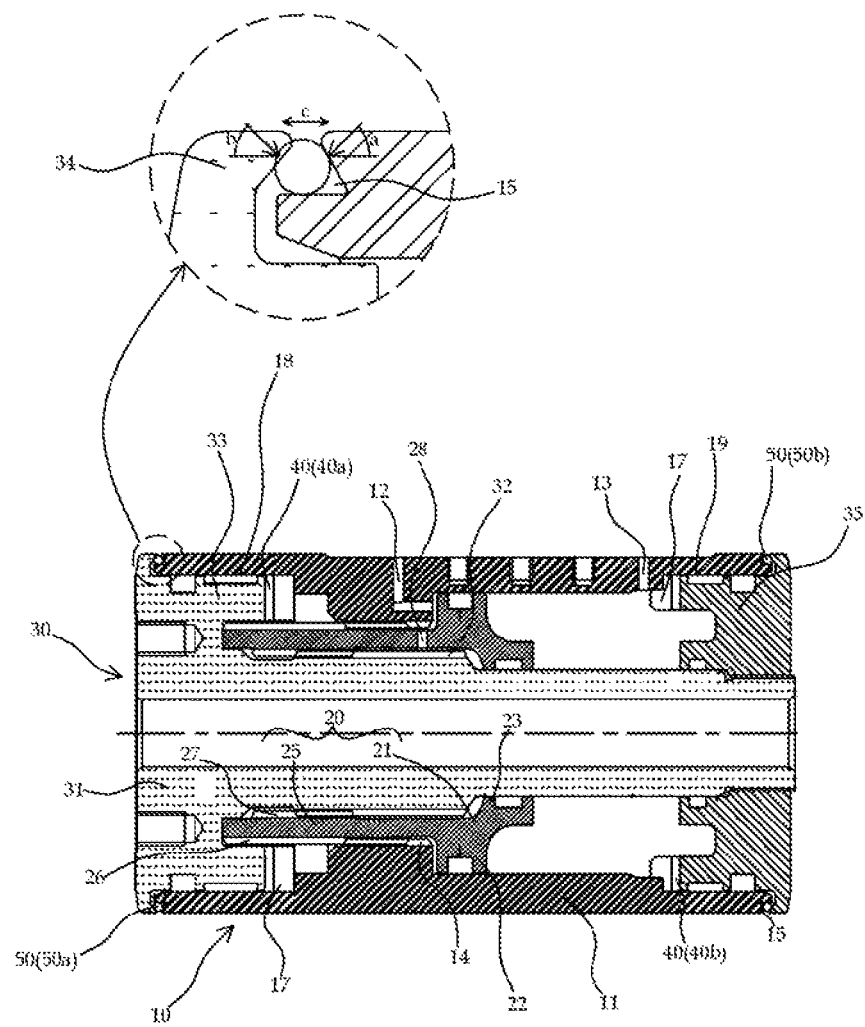
FIG. 1 is a cross-sectional view of a rotary actuator according to an exemplary embodiment of the present invention.

10: Tube assembly means
11: Tube
12: First passage
13: Second passage
14: Tube spiral portion
15: Groove
17: Support block
18: One end
19: The other end
20: Piston
21: Head portion
22: Upper portion
23: Lower portion
25: Body portion
26: Outer spiral portion
27: Inner spiral portion
28: Through hole
30: Axle load assembly means
31: Axle load
32: Axle load spiral portion
33: One end
34: Ring pressure portion
35: End cap
36: Ring pressure portion
40: Thrust bearing ring
40a: First thrust bearing ring
40b: Second Thrust bearing ring
50: Ring
50a: First ring
50b: Second Ring

DESCRIPTION OF THE PREFERRED EMBODIMENTS

Specifically structural or functional description with respect to exemplary embodiments of the present invention disclosed in the specification is illustrated only for the purpose of describing the exemplary embodiments of the present invention, and the exemplary embodiments of the present invention may be modified in various different ways, all without departing from the spirit or scope of the present invention.

As the exemplary embodiments of the present invention may be modified in various different ways and may have various modifications, the exemplary embodiments is illustrated on the drawings and is described in detail in the specification.

However, the exemplary embodiments of the present invention should not be limited to the specifically disclosed forms, and are intended to cover various modifications and equivalent arrangements, or substitutes included within the spirit and technology scope of the present invention.

The terms used in the specification are only used to describe the specific exemplary embodiments and are not intended to limit the present invention.

As used herein, the singular expressions "a", "an" and "the" are intended to include the plural expressions as well, unless the context clearly indicates otherwise.

Figure 2:
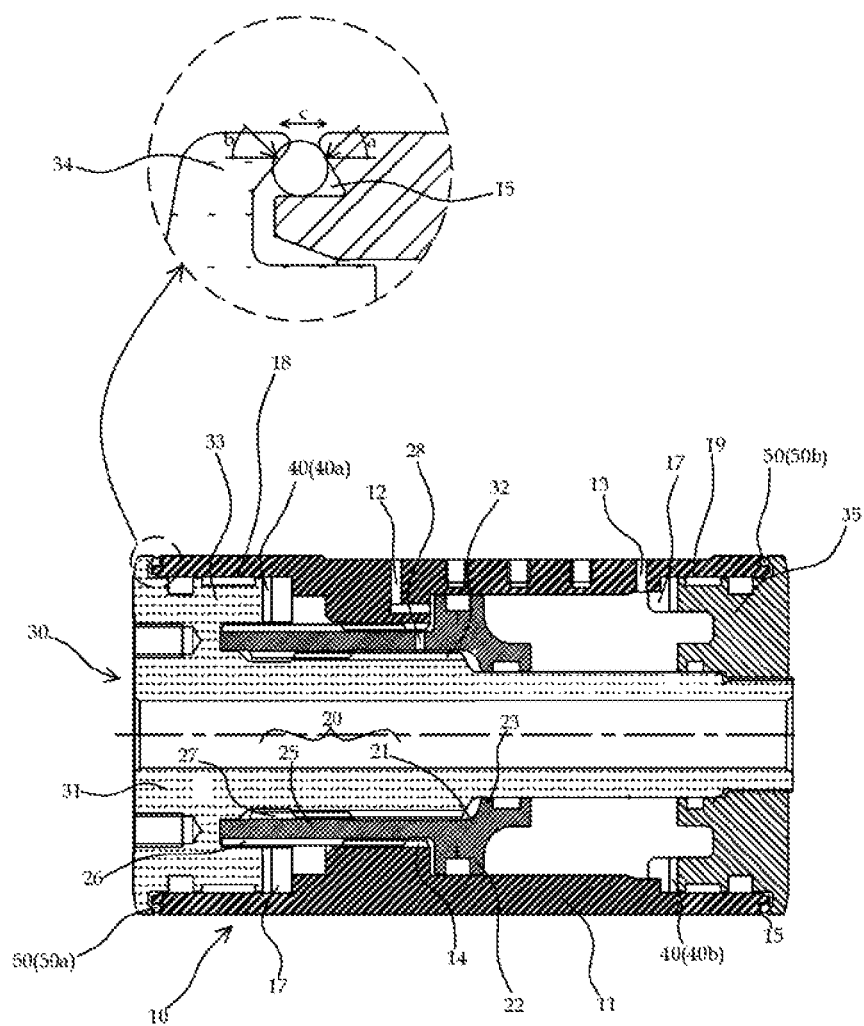
FIG. 2 is a cross-sectional view after a fluid flows into a first passage of the exemplary embodiment illustrated in FIG. 1 and thus a piston is moved.
Figure 3:
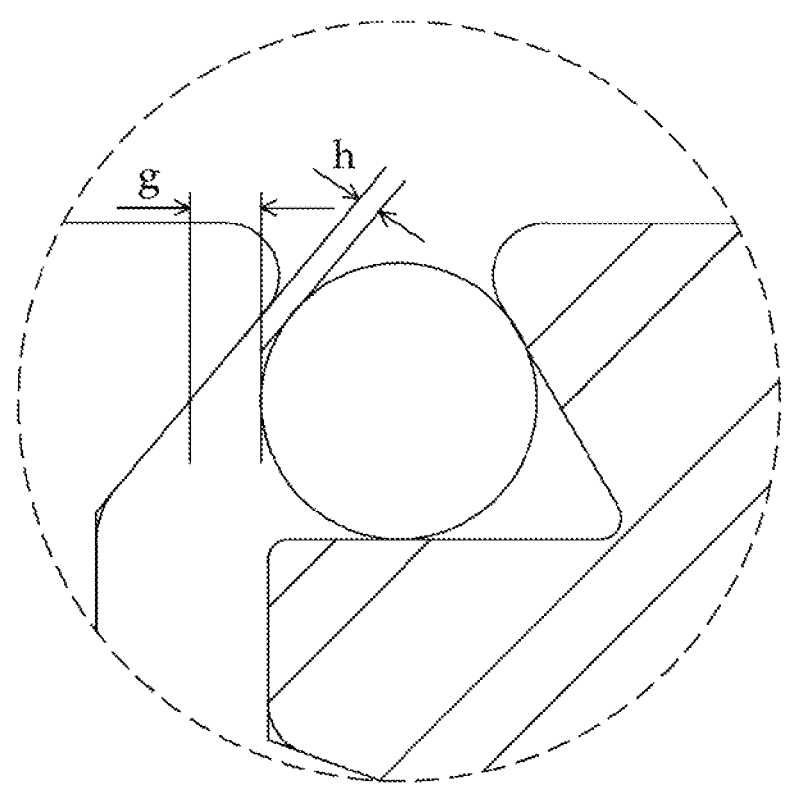
FIG. 3 is an enlarged view when a ring pressure portion of an axle load of the exemplary embodiment illustrated in FIG. 1 fluctuates in a C direction.
Figure 4:
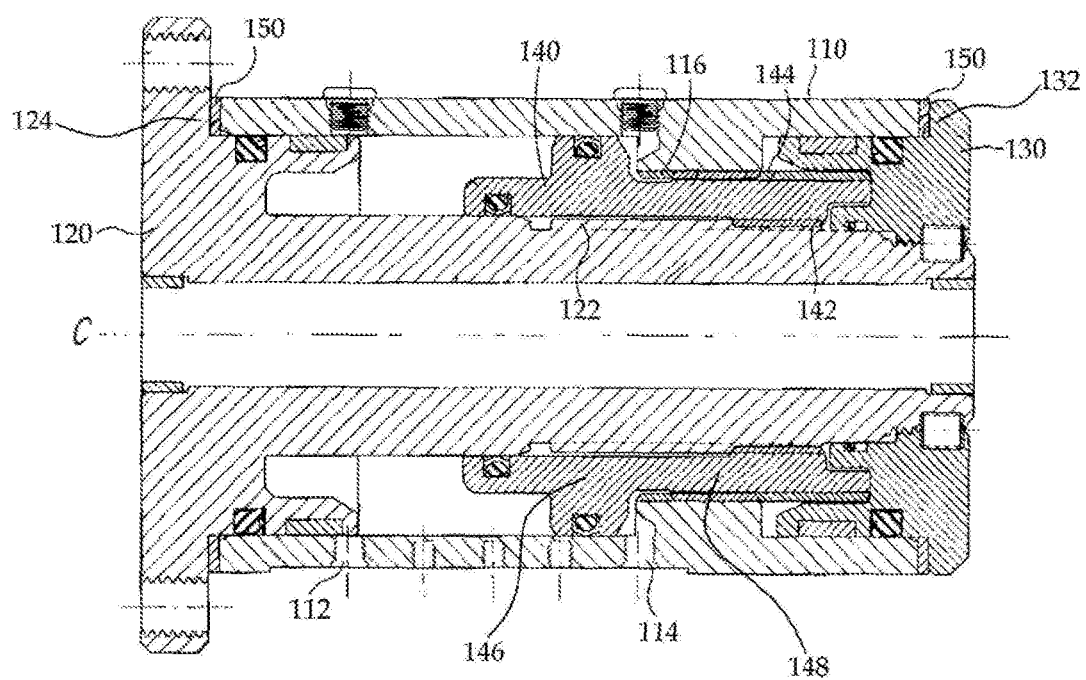
FIG. 4 is a cross-sectional view of a conventional rotary actuator.

An exemplary embodiment of the present invention will be described more fully hereinafter with reference to the accompanying drawings, FIGS. 1 to 3.

A rotary actuator according to an exemplary embodiment includes a tube assembly means 10, a piston 20, an axle load assembly means 30, a thrust bearing ring 40, and a ring 50.

The tube assembly means 10 is provided with a tube 11 and a support block 17. The tube 11 is formed of a first passage 12 where oil flows into and out; a second passage 13 spaced apart from the first passage 12 by a fixed distance; and a groove 15 where the ring 50 is inserted into opposite end portions. In this case, when a load is applied in an axial direction of the tube 11, the groove 15 is formed of a wedge shape in order to apply the load to the ring 50 at an angle (a) oblique to the axial direction. Furthermore, the tube 11 is provided with a tube spiral portion 14 where a spiral is formed at an inner circumference surface. The support block 17 is mounted at an inside of the tube 11 in order for one end of the support block 17 to be supported by the tube 11 and for the other end thereof to support the thrust bearing ring 40.

The piston 20 is mounted at an inside of the tube assembly means 10 in order for oil to move in a direction toward the second passage 13 when the oil flows into the first passage 12, and is provided with a head portion 21 and a body portion 25. The head portion 21 is provided with an upper portion 22 and a lower portion 23 in order to slide by being pressurized by the oil, and the upper part 22 contacts the inside of the tube 11 and the lower portion 23 contacts an axle load 31.

The body portion 25 is extended from one side of the head portion 21 to one end portion 33 of the axle load 31 and is provided with an outer spiral portion 26 and an inner spiral portion 27 in order to rotate the axle load 31 when the head portion 21 slides by being pressurized by the oil. In this case, the body portion 25 is formed of a through hole 28 in order for the oil to flow from an upper portion of the body portion 25 into a lower portion thereof or vice versa.

When the oil flows into the first passage 12, the head portion 21 of the piston 20 is pressurized by the oil such that the piston 20 slides in a direction toward the second entry 13. In this case, negative pressure may be generated at the lower portion of the body portion 25. When the negative pressure occurs, the negative pressure generated at the lower portion of the body portion 25 acts as resistance, thereby preventing a sliding of the piston 20.

When the through hole 28 is formed at the body portion 25 according to the exemplary embodiment, the oil flows from the upper portion of the body portion 25 into the lower portion thereof through the through hole 28 formed at the body portion 25 such that the negative pressure generated at the lower portion of the body portion 25. Meanwhile, when the oil flows into the second passage 13, the piston 20 slides in a direction toward the first passage 12. In this case, positive pressure due to the oil may be generated at the lower portion of the body portion 25. When the positive pressure occurs, the positive pressure generated at the lower portion of the body portion 25 acts as resistance, thereby preventing the piston 20 from sliding.

When the through hole 28 is formed at the body portion 25 according to the exemplary embodiment, the oil flows from the lower portion of the body portion 25 into the upper portion thereof through the through hole 28 formed at the body portion 25 such that the positive pressure generated at the lower portion of the body portion 25 may be reduced. Accordingly, resistance taken place when the piston 20 slides by the through hole 28 formed at the body portion 25 may be reduced. The outer spiral portion 26 is positioned at the outer circumference surface of the body portion 25 to be engaged with the tube spiral portion 14 in order to be rotatable while moving, and the inner spiral portion 27 is positioned at the inner circumference surface of the body portion 25 to be engaged with an axle load spiral portion 32 in order to rotate the axle load 31.

The axle load assembly means 30 is provided with the axle load 31 and an end cap. The axle load 31 is provided with the axle load spiral portion 32 and is inserted into the piston 20. One end portion 33 of the axle load 31 is supported by a first thrust bearing ring 40a positioned at one end portion 18 of the tube 11 and is exposed to one end of the tube 11, thereby closing one end portion 18 of the tube 11. In this case, the axle load 31 is formed of a ring pressure portion 34 which is capable of pressurizing the ring 50 inserted into the groove 15 of one end portion 33, and when a load is applied in the axial direction of the tube 11, the ring pressure portion 34 is obliquely formed in order to apply the load to the ring 50 at an angle (b) oblique to the axial direction.

The axle load spiral portion 32 is formed to be engaged with the inner spiral portion 27 in order to be rotatable when the piston 20 is moved. A diameter (f) of the axle load 31 which is formed of the axle load spiral portion 32 to be engaged with the inner spiral portion 27 is designed greater than a diameter (e) of the axle load 31 contacting the lower portion 23 of the head portion 21.

The end cap 35 is supported by a second thrust bearing ring 40b positioned at the other end portion 19 of the tube 11 and is exposed to the other end of the tube 11, thereby closing the other end portion 19 of the tube 11, and then the end cap 35 is fixedly screwly engaged with the other end of the axle load 31. In this case, the end cap 35 is formed of a ring pressure portion 36 which is capable of pressurizing the ring 50 inserted into the groove 15 of one end, and when a load is applied in the axial direction of the tube 11, the ring pressure portion 36 is obliquely formed in order to apply the load to the ring 50 at an angle (d) oblique to the axial direction.

In the exemplary embodiment, when the rotary actuator is assembled, the body portion 25 of the piston 20 is inserted into the inside of the tube 11 in a direction toward one end portion 33 of the axle load 31. Thus, the head portion 21 of the piston 20 is positioned toward the end cap 35 and the body portion 25 of the piston 20 is positioned toward one end portion 33 of the axle load 31. And thus consequently, the diameter (f) of the axle load may become great and the diameter (e) thereof may become small. In this case, since the diameter (f) of the axle load 31 may become great, big rotary force may become generated by virtue of a load transferred from the piston 20. Furthermore, since the diameter (e) of the axle load 31 may become small, a hydraulic pressure area of the piston 20 may become increased by improving a thickness of the head portion 21.

A pair of the thrust bearing rings 40 are positioned to be exposed to the oil at the inside of the tube 11 accommodating the oil in order to reduce frictional force of the axle load assembly means 30 and the tube assembly means 10. One end surface of the first thrust bearing ring 40a contacts a side surface of the axle load 31 and the other end surface thereof is positioned at one end portion 18 at the inside of the tube 11 in order to contact a side surface of the support block 17.

One end surface of the second thrust bearing ring 40b contacts a side surface of the end cap 35 and the other end surface thereof is positioned at the other end portion 19 at the inside of the tube 11 in order to contact the side surface of the support block 17. According to the exemplary embodiment, the piston 20 rotates while sliding along a screw of the outer spiral portion 26 engaged with the tube spiral portion 14.

When the piston 20 rotates while sliding, the axle load assembly means 30 rotates along a screw of the axle load spiral portion 32 engaged with the inner spiral portion 27 of the piston 20. Accordingly, the axle load assembly means 30 rotates and the tube assembly means 10 is fixed. In this case, the thrust bearing ring 40 is installed between the axle load assembly means 30 and the tube assembly means 10, thereby reducing the frictional force therebetween. In this case, the thrust bearing ring 40 is installed at the inside of the tube 11, thereby being exposed to the oil. Consequently, since the thrust bearing ring 40 is lubricated by the oil, abrasion of the thrust bearing ring 40 may be reduced.

In order to prevent a foreign substance from flowing inside the tube 11, the ring 50 is provided with a first ring 50a positioned between one end of the tube 11 and an end portion of the axle load 31 and a second ring 50b positioned between the other end of the tube 11 and an end portion of the end cap 35.

According to the exemplary embodiment, the first ring 50a is inserted into the groove 15 of the tube 11 and is pressurized by the ring pressure portion 34 of the axle load 31, and the second ring 50b is inserted into the groove 15 of the tube 11 and is pressurized by the ring pressure portion 36 of the end cap 35. When the actuator is continuously used, the axle load assembly means 30 fluctuates in a direction of an arrow (c).

In this case, when the axle load 31 is moved by a distance (g) in the direction of the arrow (c), the ring pressure portion 34 of the axle load 31 is obliquely formed such that the first ring 50a pressurized by the ring pressure portion 34 of the axle load 31 is deformed by a distance (h). That is, when the axle load 31 is moved by the distance (g) in the direction of the arrow (c), the first ring 50a is deformed by the distance (h). In this case, since the distance (h) of the first ring 50a which is deformed by being pressurized by the ring pressure portion 34 of the axle load 31 becomes smaller than the distance (g) by which the axle load 31 is moved in the direction of the arrow (c), a deformation amount of the first ring 50a is configured to be small, thereby improving durability.

What is claimed is:

1. A rotary actuator, comprising:
   a tube assembly including
   a tube formed of a first passage where an inside is penetrated and oil flows into and out of the inside and a second passage spaced apart from the first passage by a fixed distance, and
   a support block where one end is supported by one side of the tube at the inside of the tube;
   a piston engaged with the tube assembly and mounted at an inside of the tube assembly in order to move while rotating in a direction of the second passage when the oil flows into the first passage;
   an axle load assembly configured for one end portion to close one end portion of the tube assembly and the other end portion to close the other end portion of the tube assembly, and inserted into the piston to be engaged with the piston, wherein the axle load assembly is configured to rotate when the piston is moved; and a pair of thrust bearing rings positioned at the inside of the tube assembly in order to be exposed to the oil, the pair of thrust bearing rings comprising a first thrust bearing ring configured for one end surface to contact a side surface of the axle load assembly, configured for the other end surface to contact the other end surface of the support block in order to reduce frictional force of the axle load assembly and the tube assembly, and positioned at the one end portion of the tube assembly and a second thrust bearing ring positioned at the other end portion of the tube assembly.

2. The rotary actuator according to claim 1, wherein
the tube is provided with a tube spiral portion formed around an inner circumference surface;
the piston is provided with
an inner spiral portion formed around an inner circumference surface and
an outer spiral portion formed around an outer circumference surface in order to be engaged with the tube spiral portion; and
the axle load assembly is provided with an axle load spiral portion engaged with the inner spiral portion of the piston in order to be rotatable when the piston is moved.

3. The rotary actuator according to claim 2, wherein the axle load assembly is provided with
an axle load having the axle load spiral portion to be inserted into the piston, configured for one end portion to be supported by the first thrust bearing ring positioned at the one end portion of the tube assembly, and configured to be exposed to one end of the tube assembly and to close the one end portion of the tube assembly, and
an end cap engaged with the other end of the axle load, configured to be supported by the second thrust bearing ring positioned at the other end portion of the tube assembly, and configured to be exposed to the other end of the tube assembly and to close to the other end of the tube assembly.

4. The rotary actuator according to claim 3,
wherein the piston is provided with
a head portion configured for an upper portion to contact the inside of the tube assembly and configured for an lower portion to contact an outside of the axle load in order to slide by being pressurized by the oil, and
a body portion extended to the one end portion of the axle load from one side of the head portion, provided with the outer spiral portion at the upper portion and the inner spiral portion at the lower portion, and configured to rotate the axle load when the head portion slides by being pressurized by the oil,
wherein a diameter of the axle load contacting the lower portion of the head portion is smaller than a diameter of the axle load formed of the axle load spiral portion.

5. The rotary actuator according to any one of claim 4, further comprising
a pair of rings positioned between opposite ends of the tube assembly and opposite end portions of the axle load assembly which close the opposite end portions of the tube assembly in order to prevent a foreign substance from flowing inside the tube assembly,
wherein the opposite end portions of the tube assembly are formed of a wedge-shaped groove in order for the pair of rings to be inserted.

* * * * *